Sept. 27, 1927.

E. M. SMITH 1,643,394

PERFORATED PIPE FOR WELLS

Filed Feb. 9, 1922

INVENTOR:
EDWARD M. SMITH,
BY
Graham + Harris.
ATTORNEYS.

Patented Sept. 27, 1927.

1,643,394

UNITED STATES PATENT OFFICE.

EDWARD M. SMITH, OF LOS ANGELES, CALIFORNIA.

PERFORATED PIPE FOR WELLS.

Application filed February 9, 1922. Serial No. 535,208.

My invention relates to wells in which a metal casing is used to line the inside of the well, the casing being perforated to allow the oil or water to come through into the interior of the well.

My invention is particularly applicable to oil wells. In the commercial production of oil, it is common practice to set a string of casing in the well, this casing extending down into the oil sands. It is also common practice to perforate this string of casing, the perforations in some cases being formed by a special tool after the casing is set in the well. Where it is possible, it is considered better practice, however, to perforate the casing before placing it in the well, and many types of perforated pipe or strainer have been developed for this purpose. In some cases the perforations are formed in the pipe and the exterior of the pipe is wound with wire in such a manner as to leave small openings between the individual wires. Some inventors drill round holes in the pipe and set in buttons which have slots formed therein. A well strainer to be successful should have a fairly uniform opening and the openings in the pipe should be uniformly spaced and scientifically located.

The principal object of my invention is to provide an improved form of perforated pipe or well strainer which may be used in oil or water wells.

Further objects and advantages will be made evident hereinafter.

Referring to the drawing which is for illustrative purposes only,

Figure 5:
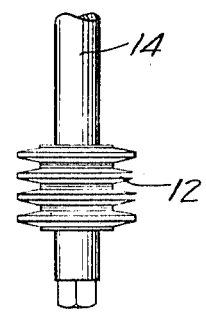
Fig. 5 is a gang of cutters.

In these drawings 11 is a pipe which it is desired to perforate. This is accomplished by a gang of cutters 12 shown in Fig. 5, these cutters being carried in a head 13 which is secured in tubing 15 and driven through a shaft 14; the tubing 15 and shaft 14 being sufficiently long to allow the head to be placed inside the pipe a sufficient distance to cut slots at the desired point, the shaft 14 being carried inside the tubing 15.

The tubing 15 is sufficiently stiff so that when clamped it holds the cutters 12 in their cutting position. The cutters 12 are forced against the inside of the pipe by fingers 16 operated by a rack 17 and a pinion 18 which is actuated by a shaft 19 also passing through the tubing 15.

In the operation of my invention the members 12 to 19 inclusive are placed inside the pipe 11, the shaft 14 being driven by any suitable source of power. The cutters 12 being rotated, teeth 20 formed thereon cut into the inner surface of the pipe forming a series of open slots extending through the pipe, these slots being shown at 21 in Figs. 3, 4 and 7.

In the form of the invention shown, four cutters 12 are employed, these cutters being of a suitable shape to form the keystone shaped openings 22 between the bars 23. As shown clearly in Figs. 3 and 4 the slots 22 are wider at the center than at the ends on a plane taken parallel to the surface of the pipe or, in other words, they are wider near the center than at the ends when taken on a plane extending at right angles to radial lines extending through the centers of the slots. It should also be noted that the side faces of the slots 22 are one continuous face and that the end faces are also one continuous face.

The object of any perforated pipe or strainer is to allow the entrance of fluids while holding back the surrounding formation. It is, of course, impossible to initially exclude fine sand or silt; but I have found, while such fine sand or silt will pass through the perforations of the pipe, that as the coarser particles pack about the outside of the pipe they act as a filter or sieve to catch such fine particles providing the perforations themselves can be kept open. I have further found that by the use of keystone shaped slots 22, which are narrowest at the external surface of the pipe, I am able to prevent packing of the slots, which by their shape are self relieving.

I am aware that previous inventors have proposed to provide screen pipe having a plurality of parallel slots, but my invention differs from all such previous attempts and is broadly new in that it provides a slotted pipe with circumferentially extending keystone shaped slots. The keystone shaped slot is superior to a slot with parallel sides in that it is narrowest at the outer surface of the pipe and any particles of sand, that are small enough to pass through the narrow opening at the surface of the pipe, will pass freely through the remainder of the slot which widens as it extends towards the inner surface of the pipe.

My invention also differs from the prior art in that it employs a radically different form of slot. This slot is formed by a cutter having conoidal sides and the slot itself has conoidal sides. This results in a slot which is not only wider at the inner surface of the pipe than at the outer surface but which is also longer on the inner surface.

Figure 1:
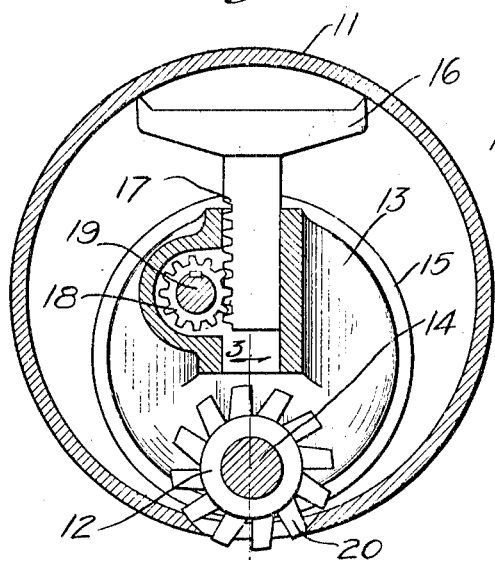
Fig. 1 is a view of a section of pipe with one form of perforating device in place therein.
Figure 2:
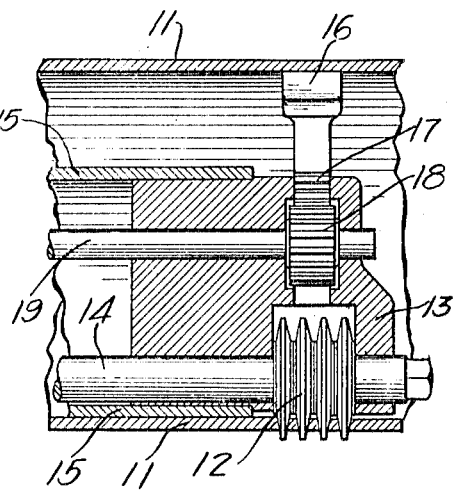
Fig. 2 is a side view of the apparatus shown in Fig. 1.
Figure 3:
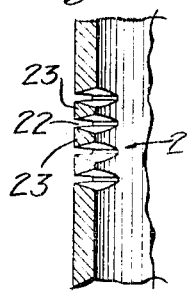
Fig. 3 is a section through the pipe on a plane represented by the line 3—3 of Fig. 1.
Figure 4:
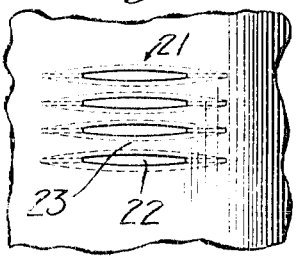
Fig. 4 is a view of the perforations as seen from outside.

That is, my invention also differs from all previous attempts to provide a slotted pipe in that the slots are not only widest at the inner surface of the pipe when considered in relation to a plane at right angles to the axis of the pipe, or in the plane of the paper as seen in Fig. 3, but they are also longest at the inner surface when considered with relation to the plane of the paper as seen in Fig. 1. In other words, the slots are not only axially wider but are also circumferentially longer on the inner surface of the pipe. This absolutely prevents any particles of sand or shale from wedging inside the slot which is relieved in both directions.

Furthermore, a form of slot is provided, by virtue of the diameter of the conoidal cutter being less than the diameter of the pipe being slotted, having an opening wider in the middle than at the ends. In practice, this has proved advantageous over the form of slot having uniform width. This is true because any matter wedging in the slots near either end may work toward the middle of the slot and become dislodged, and at the same time the capacity of the slot is maintained without having a wide mouth in the full length.

I claim as my invention:

1. A slotted pipe suitable for use in oil wells and having a plurality of slots, opposed portions of the outer mouth of each of said slots being substantially continuously curved and disposed apart a maximum distance on the minor axis of said slot.

2. A slotted pipe suitable for use in oil wells and having a plurality of slots, opposed portions of the inner and outer mouths of each of said slots being substantially continuously curved and disposed apart a maximum distance on the minor axis of said slot.

3. A slotted pipe suitable for use in oil wells and having a plurality of slots, opposed portions of the inner and outer mouths of each of said slots being arcuate in shape and disposed apart a maximum distance on the minor axis of said slot, the surfaces between corresponding portions of the inner and outer mouths of each of said slots being surfaces of rotation.

4. A slotted pipe suitable for use in oil wells and having a plurality of slots, opposed portions of the inner and outer mouths of each of said slots being arcuate in shape and disposed apart a maximum distance on the minor axis of said slot, the surfaces between corresponding arcuate portions of the inner and outer mouths of each of said slots being conoidal surfaces of rotation.

5. A slotted pipe suitable for use in oil wells and having a plurality of slots, the cross-sectional area of each of said slots increasing from the outside inward on both the major and minor axes of said slot, the opposed sides of said slot being disposed apart a maximum distance on the minor axis of said slot, said sides converging toward each other substantially continuously between said minor axis and the ends of said slot.

6. A slotted pipe suitable for use in oil wells and having a plurality of slots, opposed portions of the outer mouth of each of said slots being formed by substantially continuous curves disposed apart a maximum distance on the minor axis of said slot, said curves being relatively flat in character.

7. A slotted pipe suitable for use in oil wells and having a plurality of slots, opposed surfaces of each of said slots being conoidal surfaces of rotation and disposed apart a maximum distance on the minor axis of said slot.

In testimony whereof, I have hereunto set my hand at Los Angeles, California, this 2d day of February, 1922.

EDWARD M. SMITH.